Aug. 11, 1925.  1,549,594
A. C. MENNINGEN
TUMBLER
Filed Jan. 23, 1923  4 Sheets-Sheet 1
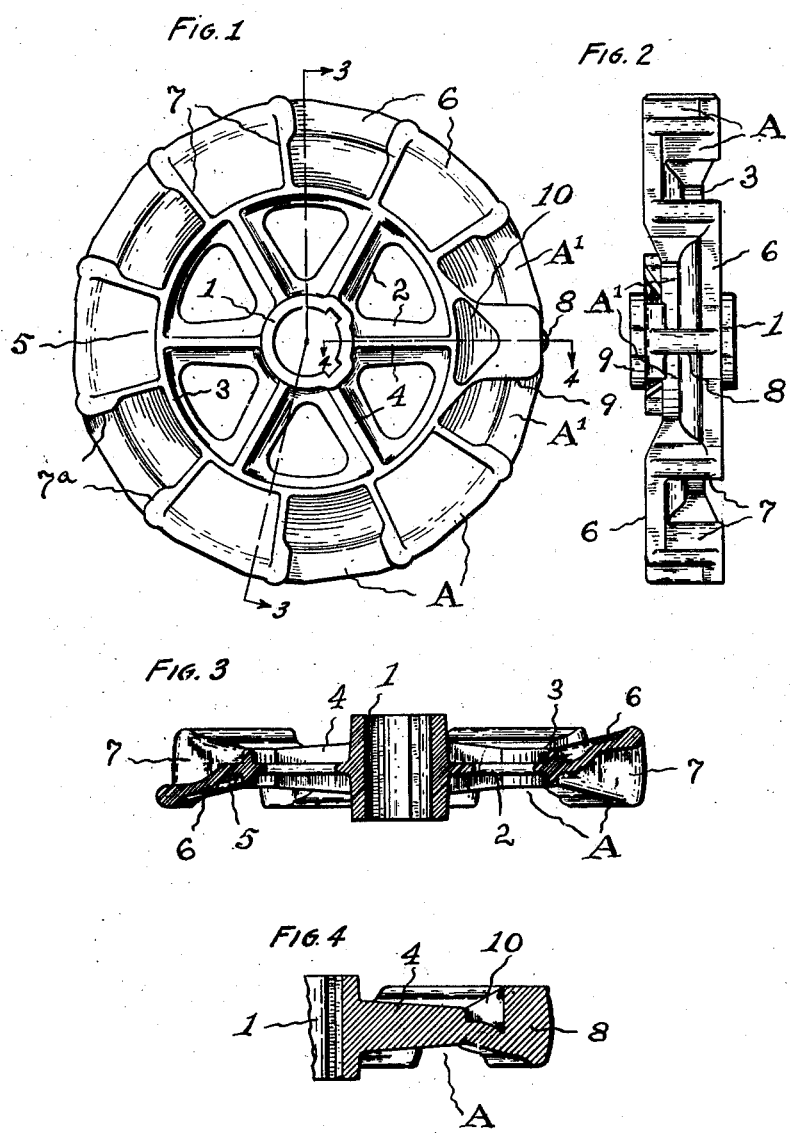

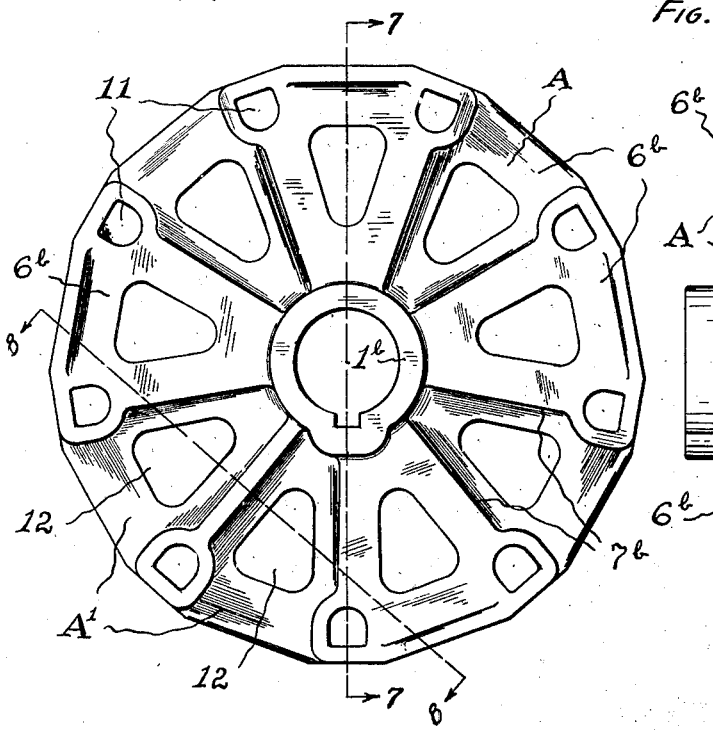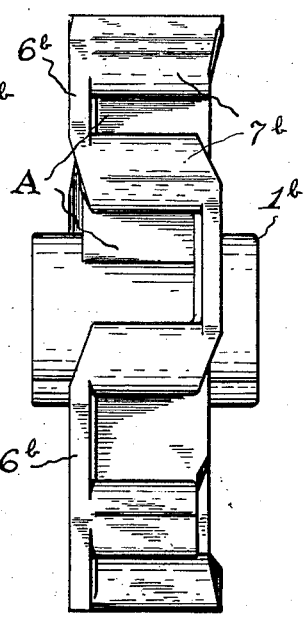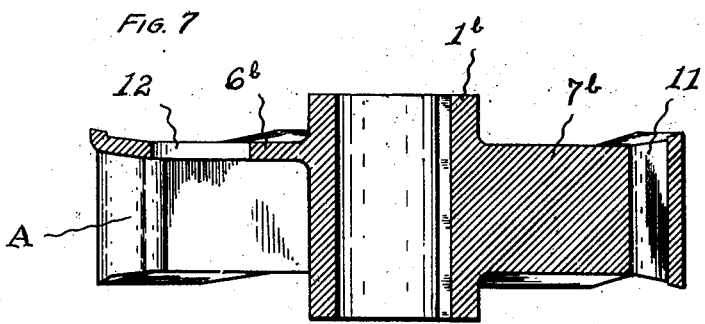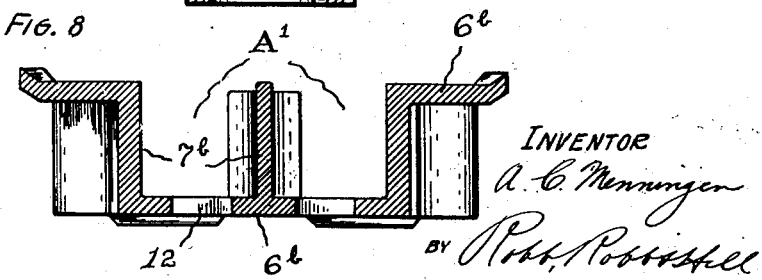

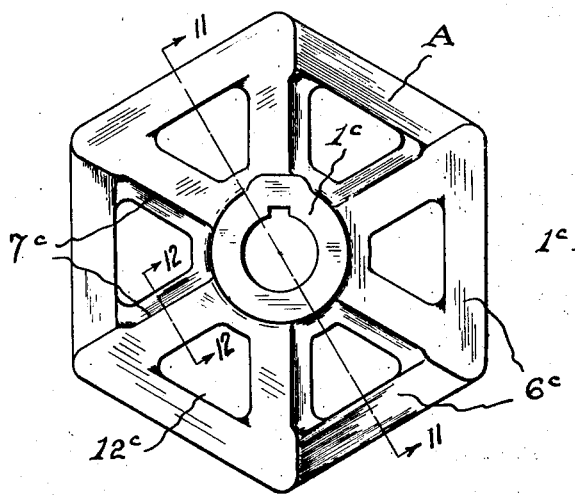
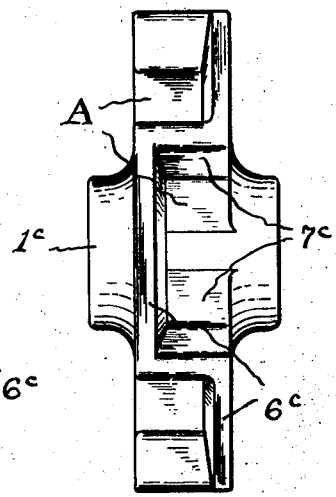
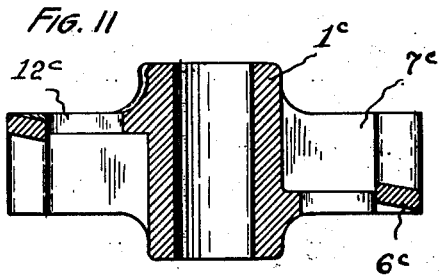
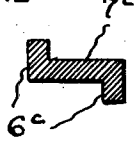

Aug. 11, 1925.
A. C. MENNINGEN
TUMBLER
Filed Jan. 23, 1923
1,549,594
4 Sheets-Sheet 4
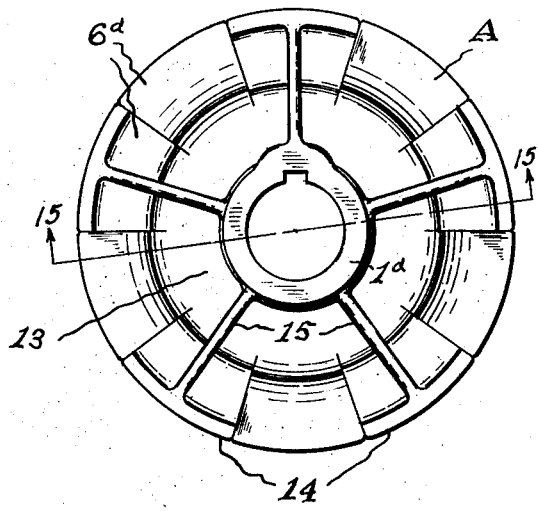
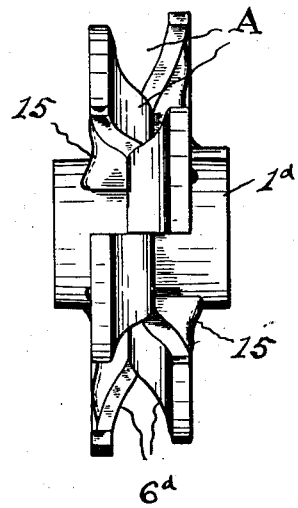
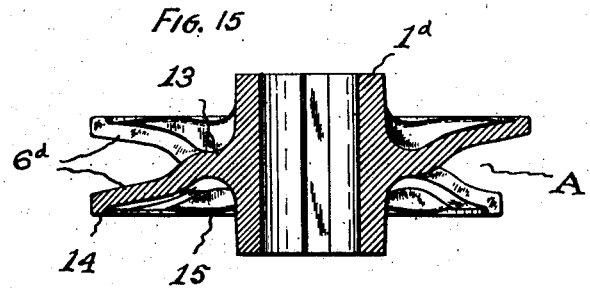

Patented Aug. 11, 1925.

1,549,594

UNITED STATES PATENT OFFICE.

ADOLPH C. MENNINGEN, OF WEST ALLIS, WISCONSIN, ASSIGNOR TO KOEHRING COMPANY, OF MILWAUKEE, WISCONSIN, A CORPORATION.

TUMBLER.

Application filed January 23, 1922. Serial No. 614,372.

*To all whom it may concern:*

Be it known that I, ADOLPH C. MENNINGEN, a citizen of the United States, residing at West Allis, in the county of Milwaukee and State of Wisconsin, have invented certain new and useful Improvements in Tumblers, of which the following is a specification.

The present invention relates to certain new and useful improvements in the construction of tumblers or sprocket wheels of that type which is more especially adapted for use in connection with the endless tracks or belts of track laying tractors.

The advantage of an endless belt or track laying tractor resides in the fact that the weight of the superposed load is distributed over a comparatively large area, so that the tractor can be driven on soft earth and through deep dust and mud. In fact, conditions may be frequently encountered in which the lower or ground reaches of the endless tracks are practically buried or submerged in the dirt and mud.

Under such conditions there is obviously a tendency of the dirt and mud to accumulate or collect between the track belt and the tumblers or sprockets around which it passes. Such accumulations of dirt and mud in the recesses of the tumblers or sprocket wheels would, if permitted to increase, tend to interfere seriously with the operation and efficiency of the tractor by stretching the belt too tightly. In fact, an excessive packing of the accumulated dirt in the sprocket recesses might even stretch the endless track to the breaking point or cause the endless track to run off from the tumbler or sprocket wheel.

Among the objects of the present invention is to overcome this difficulty by providing a tumbler or sprocket wheel which embodies novel features of construction, whereby the tumblers or sprocket wheels are what may be termed self-cleaning, and any accumulations of dirt within the sprocket recesses which might tend to interfere with the efficiency of the tractor are rendered impossible.

With the foregoing and other objects in view the invention consists in certain combinations and associations of the parts as will more fully appear as the description proceeds, the novel features thereof being pointed out in the appended claims.

For illustrative purposes four different embodiments of the invention have been shown by the accompanying drawings, in which Figure 1 is a front elevation of a tumbler which is constructed in accordance with the invention.

Figure 2 is a side view thereof.

Figure 3 is a sectional view on the line 3—3 of Figure 1.

Figure 4 is a sectional view on the line 4—4 of Figure 1.

Figure 5 is a front elevation of a slightly modified construction of the tumbler or sprocket wheel.

Figure 6 is a side view thereof.

Figure 7 is a transverse sectional view on the line 7—7 of Figure 5.

Figure 8 is a sectional view on the line 8—8 of Figure 5.

Figure 9 is a front elevation of another modification of the tumbler or sprocket wheel.

Figure 10 is a side view thereof.

Figure 11 is a transverse sectional view on the line 11—11 of Figure 9.

Figure 12 is a sectional view on the line 12—12 of Figure 9.

Figure 13 is a front elevation of a further modification of the tumbler or sprocket wheel.

Figure 14 is a side view thereof.

Figure 15 is a transverse sectional view on the line 15—15 of Figure 13.

Corresponding and like parts are referred to throughout the following description and indicated on all of the views of the drawings by like reference characters.

Specifically describing the particular embodiment of the invention which is illustrated by Figures 1 to 4 inclusive, the numeral 1 designates the hub of the tumbler which is adapted to be keyed or otherwise suitably fitted upon a conventional shaft. A series of spoke members 2 connect the hub to a rim member 3. In the present instance the spoke members are shown as being in the form of webs which are reinforced at opposite sides thereof by the ribs 4.

Extending around the periphery of the rim 3 and medially disposed with respect thereto is a peripheral web 5. The outer edge portion of the web terminates in a series of side walls 6 for the sprocket recesses A. In general these side walls are deflected laterally at opposite sides of the wheel, and the opposite sides of the recesses A are left open and unobstructed to provide for the quick and ready escape of any mud or dirt which may be caught between the endless track belt and the tumbler or sprocket wheel. The end walls 7 of the sprocket recesses A extend transversely with respect to the wheel and connect the end portions of adjacent side walls 6. These transverse end walls 7 extend inwardly beyond the side walls 6 and join the rim 3, thereby serving to reinforce the rim and the web 5 and forming lateral U-shaped pockets. A strong and rigid construction is thereby obtained, and such a construction is obviously desirable in the power wheel which is used for driving the endless track belt. The outer ends of the end walls 7 may be suitably enlarged or thickened at 7ª for the purpose of stiffening and reinforcing the construction and providing additional metal at those parts of the wheel which are necessarily subjected to considerable wear by reason of being brought repeatedly into frictional engagement with the sprocket teeth of the endless track belt.

The tumbler or sprocket wheel may be formed with any desired or suitable number of the sprocket recesses A. Where there are an even number of these recesses all of the recesses will open alternately upon opposite sides of the tumbler and have a strictly staggered relation, although where there is an uneven number of the sprocket recesses, as in the tumbler which has been illustrated, there will be two adjacent recesses, such as those indicated at A' which will open on the same side of the tumbler. These adjacent recesses are separated by an end wall 8 which connects the side walls 6 to a comparatively short auxiliary side wall 9 on the opposite side of the tumbler. The base of the end wall 8 and the auxiliary side wall 9 may be cored out, as indicated at 10, if desired, for the purpose of reducing the weight of the structure.

The entire structure of this tumbler or sprocket wheel may be formed from a single piece of material and have an integral formation. The radial ribs 4 of the spoke members and the arrangement of the end walls 7 cooperate with each other to stiffen and reinforce the entire tumbler, so that a very strong construction is obtained. The sprocket recesses A are adapted to engage the corresponding sprocket teeth of a conventional endless track belt as the said belt passes around the tumbler, the particular construction of the endless track belt being immaterial and no track having been illustrated on the drawings, for the reason that such endless tracks are well known in the tractor art. As the endless track passes around the tumbler there will be a tendency for mud and dirt to accumulate between the tumbler and the links of the track, although any such accumulations of mud and dirt will be forced inwardly and discharged laterally through the open sides of the recesses A. The discharge openings are so large and the escape of mud and dirt so easy that it will be impossible for mud or dirt to accumulate within the sprocket recesses A to such an extent as to interfere in the slightest with the efficient and proper operation of the tractor.

A slight modification is illustrated by Figures 5 to 8 inclusive, in which the hub is designated by the reference character 1ᵇ. The sprocket recesses A are formed by side walls 6ᵇ and transverse end walls 7ᵇ which radiate from the hub 1ᵇ and for the most part zigzag or alternate so that the sprocket recesses A open laterally upon opposite sides of the tumbler. In this modification the sprocket recesses A are substantially segmental in shape, and the outer ends of the end walls 7ᵇ are thickened to stiffen and reinforce the tumbler at this point. The thickened outer ends of the end walls are cored out transversely, as indicated at 11, thereby reducing the amount of metal required and keeping down the weight of the tumbler. The particular tumbler which has been illustrated has an uneven number of the sprocket recesses A, so that two adjacent recesses A' face upon one side of the tumbler. The side walls 6ᵇ may have openings 12 cut therein, thereby additionally reducing the weight of the tumbler and at the same time providing further outlets for the escape of mud and dirt which might otherwise have a tendency to accumulate within the sprocket recesses A.

A further modification is illustrated by Figures 9 to 12 inclusive, in which the reference character 1ᶜ designates the hub. The sprocket recesses A are formed by side walls 6ᶜ and end walls 7ᶜ which radiate from the hub and are arranged in a zigzag relation. The result is that alternate sprocket recesses A open upon opposite sides of the tumbler and the open sides of the sprocket recesses provide, as in the previous instance, for the escape of any mud or dirt which might otherwise tend to accumulate and become packed within the recesses. The side walls 6ᶜ may be formed with openings 12ᶜ to reduce the metal and provide additional outlets for the escape of mud and dirt. The outer ends of the end walls 7ᶜ may be thickened, as indicated, to stiffen and reinforce the construction and resist the wear at this point.

A still further modification is shown by Figures 13 to 15 inclusive of the drawings, in which the reference numeral 1ᵈ indicates the hub of the tumbler. A web 13 surrounds the hub and extends peripherally therefrom, and projecting radially from the hub are the side walls 6ᵈ of the sprocket recesses A. These side walls form in effect continuations of the web which are deflected alternately toward opposite sides of the tumbler. The outer edges of the side walls are stiffened by the ribs 14 and radial ribs 15 extend from the hub 1ᵈ along the outer side of each of the side walls 6ᵈ, being connected at their outer ends with the ribs 14. In this modification the sprocket recesses A have open ends and one open side. There are no end walls to the sprocket recesses, as in the previously described forms of the invention. The side walls are effectively reinforced and stiffened by the ribs 14 and 15 so that a strong and rigid construction is obtained and it will be obvious that any dirt or mud which may be caught between the endless track and the tumbler will be readily discharged through the open sides of the sprocket recesses and prevented from accumulating or packing within the recesses in such a manner as to interfere with the proper and efficient action of the tumbler.

In all of the different forms of the invention effective provision has been made for the escape of mud and dirt, and each of the sprocket recesses has an open side which makes it impossible for mud or dirt to accumulate and pack within the recesses in such a manner as to interfere with the operation of the device.

In certain of the forms of the invention the bases of the sprocket recesses are inclined toward the open sides of the recesses to faciltate the discharge of dirt accumulations through the said open sides. Furthermore, the construction of the sprocket recesses with open sides eliminates the use of unnecessary metal or material in the construction of the tumbler, and enables the metal to be so positioned as to give the maximum strength for the amount of metal employed.

While several different embodiments of the invention have been illustrated and described in detail, it will be understood that many modifications and changes can be made in the details of construction without departing from the spirit of the invention and within the scope of the claims.

On the accompanying drawings the forms of the invention shown by Figures 1 to 12 inclusive are tumbler wheels which receive power and transmit it to the endless belt, while the form of invention illustrated by Figures 13 to 15 is a tumbler wheel which is merely intended to act as an idler. Throughout this description and in the claims the term tumbler wheel is intended to be sufficiently broad to include either a driving wheel or an idler.

Having thus described my invention what I claim as new and desire to secure by Letters Patent is,

1. A tumbler wheel formed with sprocket recesses having open sides to provide for the escape of dirt accumulations, and each recess comprising a side and two end walls forming lateral U-shaped pockets, adjacent side walls projecting from the periphery of the wheel in spaced planes, and an end wall being provided between each adjacent two side walls.

2. A tumbler wheel formed with sprocket recesses each having end walls, the adjacent walls of alternate recesses being provided with connecting sides at one side of the tumbler wheel and the intermediate recesses having their end walls connected by sides at the opposite side of the wheel.

3. A tumbler wheel formed with sprocket recesses, each of which has one side wall and two transverse end walls, the side walls and end walls extending around the periphery of the wheel in a zigzag relation, whereby the sprocket recesses have open sides which face alternately on opposite sides of the wheel and provide for the escape of dirt accumulations.

4. An endless traction belt tumbler wheel including a wheel body, a peripheral web extending around the wheel body, and side walls projecting from the peripheral web and alternately deflected laterally in opposite directions to provide sprocket recesses having open sides to provide for the escape of dirt accumulations, said recesses adapted to receive projections of an endless traction belt.

5. A tumbler wheel including a wheel body, a peripheral web extending around the wheel body, side walls projecting from the web and deflected laterally in opposite directions, transverse end walls connecting adjacent side walls and cooperating therewith to provide sprocket recesses having open sides which face alternately on opposite sides of the wheel.

6. A tumbler wheel formed with sprocket recesses each of which has one side wall and two transversely disposed end walls, the outer edges of the end walls being reinforced and the side walls and end walls extending around the wheel in a zigzag manner, whereby the sprocket recesses have open sides to provide for the escape of dirt accumulations.

7. A tumbler wheel including a wheel body, side walls and end walls extending around the periphery of the wheel in a zigzag relation to provide sprocket recesses having open sides which face alternately on opposite sides of the wheel to provide for the escape of dirt accumulations, and reinforcing means between the wheel body and the walls of the sprocket recesses.

8. A tumbler wheel including a wheel body, a peripheral web extending around the wheel body, side walls projecting from the peripheral web and deflected laterally in opposite directions, transverse walls connecting adjacent side walls and having inward extensions which project along the sides of the web and join the wheel body, the side walls and end walls cooperating with each other to provide sprocket recesses having open sides to provide for the escape of dirt accumulations.

9. An endless traction belt tumbler wheel including a wheel body, a peripheral web extending around the wheel body, side walls projecting from the web and alternately deflected laterally in opposite directions to provide open sided sprocket recesses to receive projections of an endless traction belt, the bases of the recesses being inclined toward the open sides thereof, so that dirt accumulations will be readily discharged through the open sides.

10. A tumbler wheel having a peripheral row of sprocket recesses, of which each recess is formed with one side wall and transverse end walls, the side walls and end walls having a zigzag relation so that the sprocket recesses have open sides facing alternately on opposite sides of the wheel, and the bases of the recesses being inclined toward the open sides thereof to facilitate the discharge of dirt accumulations.

11. A tumbler wheel formed with sprocket recesses having open sides to provide for the escape of dirt accumulations, and comprising side and end walls projecting from the wheel periphery, each recess having only one side wall and the same located in a plane substantially continuing from the plane of the side of the wheel, and the end walls extending across the wheel periphery and connecting adjacent side walls.

In testimony whereof I affix my signature.

ADOLPH C. MENNINGEN.